(12) United States Patent
Cassuto

(10) Patent No.: US 9,238,738 B2
(45) Date of Patent: Jan. 19, 2016

(54) GERMANATE-CONTAINING THERMAL BARRIER COATING

(71) Applicant: Thermatin Industries, LLC, Boulder, CO (US)

(72) Inventor: James Cassuto, Katonah, NY (US)

(73) Assignee: Thermatin Industries, LLC, Boulder, CO (US)

( * ) Notice: Subject to any disclaimer, the term of this patent is extended or adjusted under 35 U.S.C. 154(b) by 169 days.

(21) Appl. No.: 13/972,106

(22) Filed: Aug. 21, 2013

(65) Prior Publication Data

US 2014/0057129 A1 Feb. 27, 2014

Related U.S. Application Data

(60) Provisional application No. 61/691,886, filed on Aug. 22, 2012.

(51) Int. Cl.
| | | |
|---|---|---|
| *B32B 9/00* | (2006.01) | |
| *B32B 15/04* | (2006.01) | |
| *B32B 19/00* | (2006.01) | |
| *B05D 1/36* | (2006.01) | |
| *B05D 7/00* | (2006.01) | |
| *B05D 3/02* | (2006.01) | |
| *C23C 4/00* | (2006.01) | |
| *C23C 8/00* | (2006.01) | |
| *C09D 5/26* | (2006.01) | |
| *F01D 25/08* | (2006.01) | |
| *C23C 4/10* | (2006.01) | |
| *C23C 4/12* | (2006.01) | |

(52) U.S. Cl.
CPC . *C09D 5/26* (2013.01); *C23C 4/105* (2013.01); *C23C 4/127* (2013.01); *F01D 25/08* (2013.01); *Y02T 50/675* (2013.01); *Y10T 428/12549* (2015.01); *Y10T 428/12611* (2015.01); *Y10T 428/31678* (2015.04)

(58) Field of Classification Search
CPC ............ C23C 4/105; C09D 5/26; F01D 25/08
USPC ........ 427/419.2, 372.2, 376.2, 446, 453, 585, 427/588, 596; 428/632, 472, 701, 702
See application file for complete search history.

(56) References Cited

U.S. PATENT DOCUMENTS

| | | | |
|---|---|---|---|
| 3,617,358 A | 11/1971 | Dittrich | |
| 4,485,151 A | 11/1984 | Stecura | |
| 5,732,102 A * | 3/1998 | Bouadma | 372/96 |
| 6,177,200 B1 | 1/2001 | Maloney | |
| 6,251,504 B1 | 6/2001 | Jaslier et al. | |
| 6,352,788 B1 | 3/2002 | Bruce | |
| 6,432,478 B2 | 8/2002 | Jaslier et al. | |
| 6,472,018 B1 | 10/2002 | Warnes et al. | |
| 7,065,115 B2 * | 6/2006 | Kruschwitz et al. | 372/39 |
| 7,282,079 B2 | 10/2007 | Mizuno et al. | |
| 2006/0255718 A1 * | 11/2006 | Matsuda et al. | 313/503 |
| 2008/0083905 A1 * | 4/2008 | Alfano et al. | 252/301.4 R |

* cited by examiner

*Primary Examiner* — Jonathan Langman
(74) *Attorney, Agent, or Firm* — Renner, Otto, Boisselle & Sklar, LLP

(57) ABSTRACT

A thermal barrier coating having a reduced high temperature thermal conductivity includes group II germanate constructs. This thermal barrier coating may be applied directly to a substrate, applied to a bond-coated substrate, and/or incorporated into a protective coating including one or more other thermal barrier coating layers. The thermal barrier coating provides improved thermal protection properties over current industry standards and materials considered for thermal protection applications.

19 Claims, 3 Drawing Sheets

GERMANATE-CONTAINING THERMAL BARRIER COATING

TECHNICAL FIELD

The technology of the present disclosure relates generally to thermal barrier coatings and, more particularly, to germanate-containing thermal barrier coatings for metallic substrates.

BACKGROUND

Thermal barrier coatings are highly-advanced materials applied to the surface of substrates, often metals, to protect the substrate from great and prolonged heat loads. Thermal barrier coatings have been shown to decrease the temperature at the surface of the metal substrate, thereby improving the thermal durability of the metal component and enhancing its performance.

The use of thermal barrier coatings has become increasingly popular in the area of advanced turbine engine applications. Gas turbine engines are more frequently required to operate at higher temperatures due to advancements in propulsion technologies, as well as the demand to increase engine efficiency and reduce fuel consumption. Increased operating temperatures necessitate an increase in the operating temperature of the metallic turbine engine components such as the turbine blades, vanes, diffusers, etc. Despite the success of current thermal barrier coatings, there is a continuing desire to develop thermal barrier coatings that exhibit superior thermal protection and durability.

SUMMARY

The present disclosure provides a thermal barrier coating having improved high temperature thermal resistant properties. The thermal barrier coating provides improved thermal insulation capabilities, thereby allowing for improved engine efficiency via higher operating temperatures. In addition, the thermal barrier coating of the present disclosure provides improved thermal barrier coating durability. The thermal barrier coating allows for reduced thermal barrier coating thickness and reduced weight. The thermal barrier coating in accordance with the present disclosure may form a protective coating absent the presence of additional layers, or may form a part of a protective coating having one or more additional layers.

In a first aspect of the invention, there is provided a thermal barrier coating that includes a group II germanate having the formula $Y_2GeO_4$, wherein Y is chosen from Be, Mg, Ca, Sr, Ba, Ra, or a combination of two or more thereof.

In one embodiment of the thermal barrier coating, Y is Mg.

In one embodiment, the thermal barrier coating is doped with one or more metals.

In one embodiment, the thermal barrier coating is doped with Cr, Fe, or a combination of Cr and Fe.

In one embodiment, the thermal barrier coating has an olivine crystalline structure.

In one embodiment, the thermal barrier coating has a thermal conductivity of less than $2.0\ W\cdot m^{-1}K^{-1}$ at about 700° C.

In one embodiment, the thermal barrier coating has a minimum linear thermal expansion coefficient of $9.0\times10^{-6\circ}\ C.^{-1}$ at about 0° C. to about 1000° C.

In one embodiment, the thermal barrier coating has a maximum use temperature of greater than about 1600° C.

In one embodiment, the thermal barrier coating has a density of less than $7.5\ g/cm^3$.

In another aspect of the invention, there is provided a method of applying the group II germanate thermal barrier coating by thermal spray coating, electron beam physical vapor deposition, or enameling.

In another aspect of the invention, there is provided a coated substrate that includes: a substrate; and a group II germanate thermal barrier coating layer formed on a surface of the substrate, the group II germanate layer including $Y_2GeO_4$, wherein Y is chosen from Be, Mg, Ca, Sr, Ba, Ra, or a combination of two or more thereof.

In one embodiment, the coated substrate further includes an oxide layer between the substrate and the group II germanate thermal barrier coating layer.

In one embodiment, the coated substrate further includes a bond layer between the substrate and the group II germanate thermal barrier coating layer.

In one embodiment, the bond layer includes an aluminide bond coat.

In one embodiment, the coated substrate further includes an oxide layer between the bond layer and the group II germanate thermal barrier coating layer.

In one embodiment, the substrate on which the thermal barrier layer is coated includes a nickel superalloy.

In one embodiment, the coated substrate further includes a top layer formed on the group II germanate thermal barrier coating layer, the top layer including yttria-stabilized zirconia, titanium oxide, or a combination of yttria-stabilized zirconia and titanium oxide.

The foregoing and other features of the disclosure are hereinafter described in greater detail with reference to the accompanying drawings.

DESCRIPTION

Figure 1:
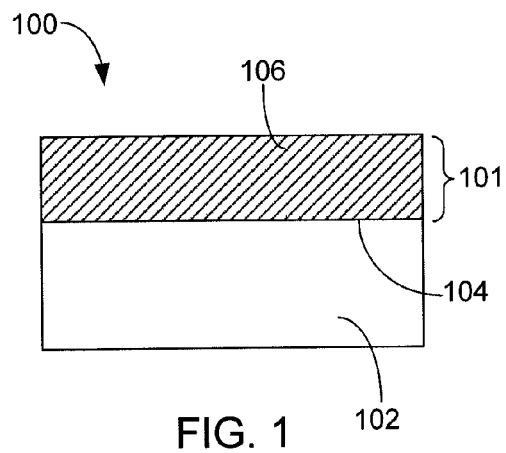
FIG. 1 is a cross-sectional view of a group II germanate thermal barrier coating deposited on the surface of a substrate in accordance with an embodiment of the present invention.

In the description that follows, like components have been given the same reference numerals, regardless of whether they are shown in different embodiments. To illustrate an embodiment(s) of the present invention in a clear and concise manner, the drawings may not necessarily be to scale and certain features may be shown in somewhat schematic form.

Features that are described and/or illustrated with respect to one embodiment may be used in the same way or in a similar way in one or more other embodiments and/or in combination with or instead of the features of the other embodiments.

Referring now in detail to the drawings and initially to FIG. 1, an exemplary structure 100 includes a protective coating 101 deposited on the surface 104 of a substrate 102, the protective coating 101 including a group II germanate thermal barrier coating 106.

The substrate 102 may be a metallic component suitable for operating in a high-temperature environment, such as a component of a gas turbine engine (e.g., a turbine blade, vane, diffuser, etc.). For example, the substrate may be made of a superalloy. Superalloys are metals, usually formed from iron, nickel, or cobalt, and containing chromium and aluminum. Superalloys may additionally include titanium and other refractory metals. In other embodiments, the substrate may be another suitable metal or metal alloy, such as steel, copper alloy, titanium alloy, etc. Furthermore, while exemplary substrates are described in the context of gas turbine engine components, the substrate may be any other suitable component subjected to a high-temperature environment.

The group II germanate thermal barrier coating 106 is formed on the surface 104 of the substrate 102 and includes a group II germanate having the formula:

wherein Y is chosen from a group II alkaline earth metal element. In one embodiment, Y includes Mg. In another embodiment, Y includes Ca. In other embodiments, Y includes Be, Mg, Ca, Sr, Ba, Ra, or a combination of two or more thereof.

In some embodiments, the group II germanate thermal barrier coating 106 is made primarily of the group II germinate $Y_2GeO_4$ and does not contain other germanium-oxide constructs other than $Y_2GeO_4$. Although in other embodiments, and given the various methods of manufacturing the group II germanate thermal barrier coating 106, a percentage of the final product may contain germinum-oxide constructs other than $Y_2GeO_4$. Examples of other germanium-oxide constructs include $YGeO_3$ and GeO2.

In one embodiment, the group II germanate thermal barrier coating 106 may contain greater than about 95 wt % $Y_2GeO_4$. In another embodiment, the group II germanate thermal barrier coating 106 may contain between about 95 wt % and about 30 wt % $Y_2GeO_4$. In yet another embodiment, the group II germanate thermal barrier coating 106 may contain between about 95 wt % and about 60 wt % $Y_2GeO_4$. In a further another embodiment, the group II germanate thermal barrier coating 106 may contain between about 60 wt % and about 30 wt % $Y_2GeO_4$.

The group II germanate may be doped with one or more metal elements or alloys. In one embodiment, the group II germanate is doped with Cr, Fe, or a combination of Cr and Fe. In one embodiment, the group II germinate is doped with Cr at a concentration of 0.015 Cr:Ge. Other concentration ratios may be employed provided the thermal and structural properties of the thermal barrier coating are maintained.

The thickness of the group II germanate thermal barrier coating is typically less than 1 mm. For example, the thickness may be in the range of about 10 μm to about 500 μm, or about 10 μm to about 300 μm, or about 25 μm to about 300 μm, or about 10 μm to about 300 μm, about 50 μm to about 250 μm, or about 50 μm to about 175 μm.

While germanates have proven quite successful as near-infrared tunable laser crystals, the inventors of the present disclosure have found that group II germanates may be successfully applied and incorporated into thermal barrier coatings as a thermal insulator. While not to be bound by theory, it is believed that germanates ($GeO_4$) possess similar properties to that of silicates. For example, it has been shown that calcium germanate ($Ca_2GeO_4$) adopts an olivine crystalline structure, as does magnesium silicate. Magnesium silicate, also known as forsterite, has been shown to be highly heat resistant, and has been used in both thermal barrier coating applications.

The embodiments of the protective coating 101 as described above include the group II germanate thermal barrier layer 106 deposited directly on the surface 104 of the substrate 102 (e.g., as shown in FIG. 1). In other embodiments, the protective coating may include one or more additional layers.

Figure 2:
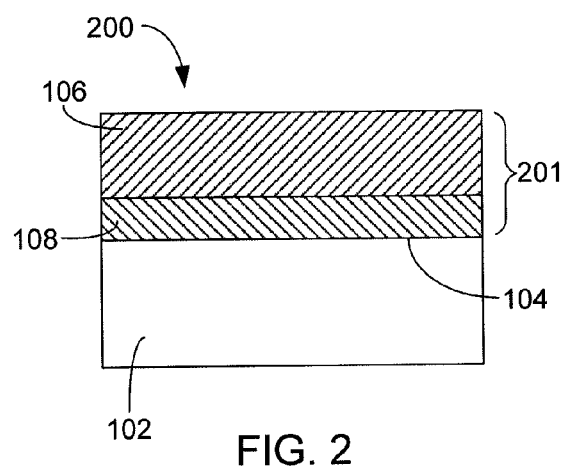
FIG. 2 is a cross-sectional view of a thermal barrier coating on the surface of a substrate with an interfacial metal oxide layer between the substrate and the thermal barrier coating in accordance with an embodiment of the present invention.

FIG. 2 shows a structure 200 in which a protective coating 201 is deposited on the surface 104 of the substrate 102, the protective coating 201 including an interfacial metal oxide layer 108 between the substrate 102 and the group II germanate thermal barrier layer 106. The interfacial metal oxide 108 layer is typically formed due to the high temperature of the binding/curing process of the protective coating.

Figure 3:
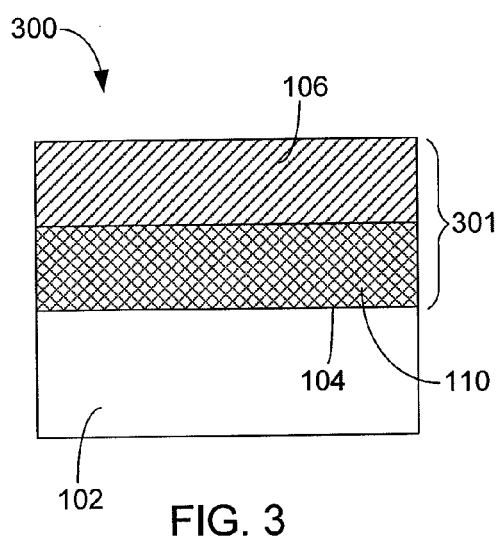
FIG. 3 is a cross-sectional view of a thermal barrier coating on the surface of a substrate with a bond coating between the substrate and the thermal barrier coating in accordance with an embodiment of the present invention.

FIG. 3 shows a structure 300 in which a protective coating 301 is deposited on the surface 104 of the substrate 102, the protective coating 301 including a bond coat 110 between the substrate 102 and the group II germanate thermal barrier layer 106. The bond coat aids in the adherence of the group II germanate thermal barrier layer 106 to the substrate 102. Similar to the group II germanate thermal barrier layer 106, the bond coat may be formed by a processes such as thermal spray (e.g., plasma spray), electron beam physical vapor deposition, sputtering, and enameling. The bond coat 110 may be a metallic bond coat such as a MCrAlY or an aluminide coating. A MCrAlY bond coat may include 10-25 wt % Cr, 5-15 wt % Al, 0.1-1.0 wt % Y, balance selected from Fe, Ni, Co, and a combination of Ni and Co. Additions of up to 5 wt % each of Hf, Ta, or Re; up to 1 wt % of Si; and up to 3 wt % each of Os, pt, Pd, or Rh may also be made. In some embodiments, the structure may include more than one bond coat between the substrate 102 and the group II germanate thermal barrier layer 106.

Figure 4:
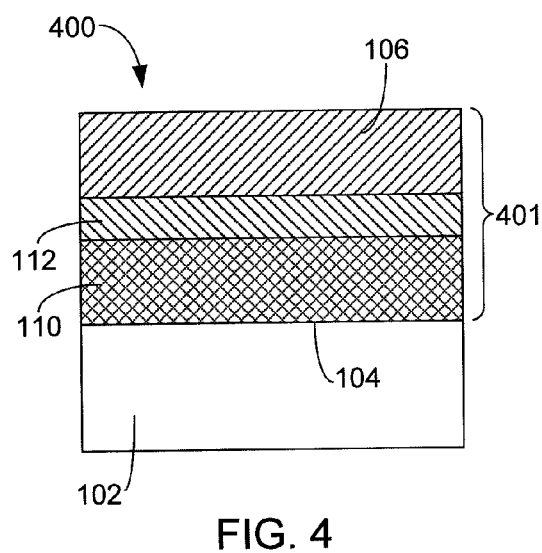
FIG. 4 is a cross-sectional view of a thermal barrier coating on the surface of a substrate with an interfacial metal oxide layer and a bond coating between the substrate and the thermal barrier coating in accordance with an embodiment of the present invention.
Figure 5:
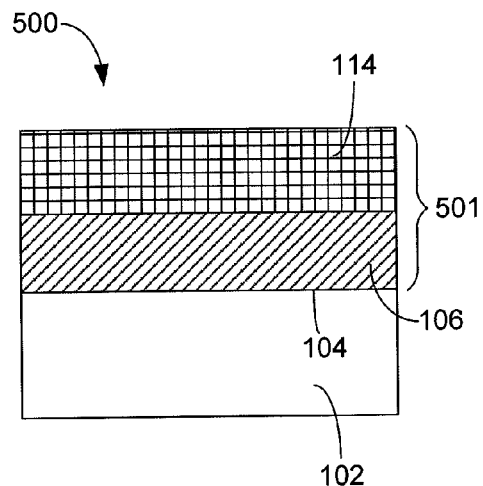
FIGS. 5-8 are cross-sectional views of the embodiments of FIGS. 1-4, respectively, further including an additional thermal barrier layer on top of the group II germanate thermal barrier coating layer.
Figure 6:
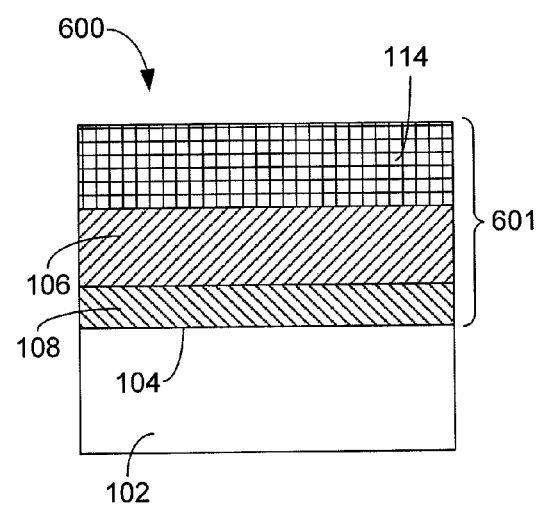
Figure 7:
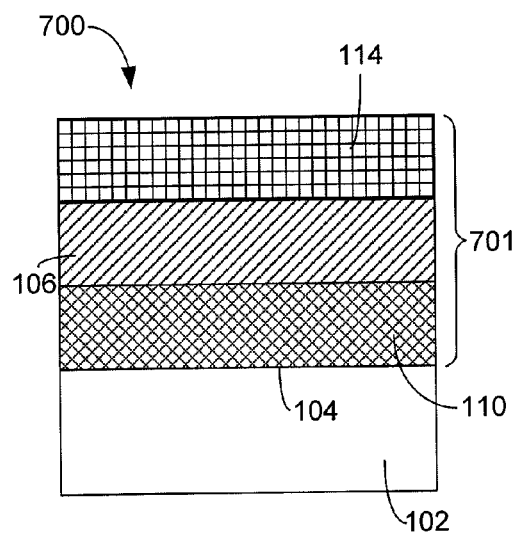
Figure 8:
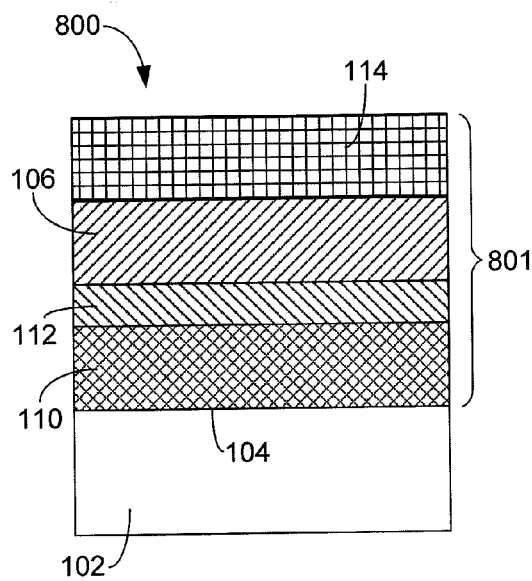
Figure 9:
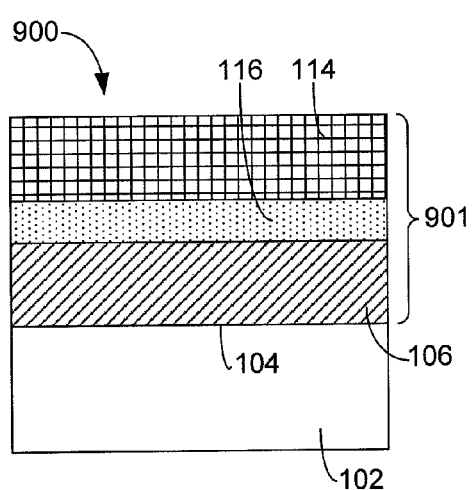
FIGS. 9-12 are cross-sectional views of the embodiments of FIGS. 5-8, respectively, further including an interfacial layer between the group II germanate thermal barrier layer and the additional thermal barrier layer.
Figure 10:
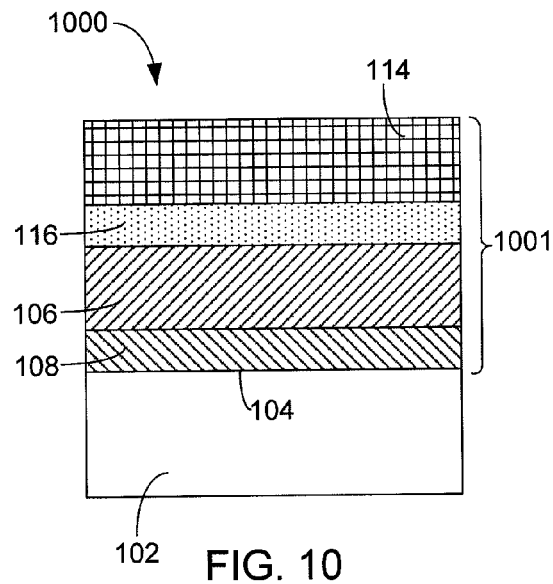
Figure 11:
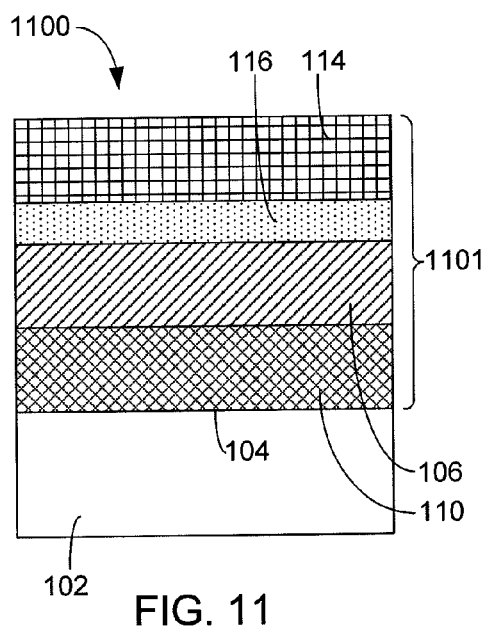
Figure 12:
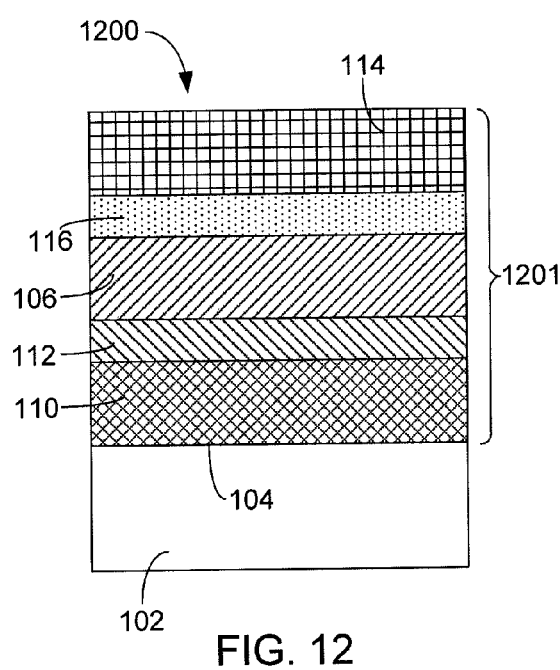

FIG. 4 shows a structure 400 in which a protective coating 401 is deposited on the surface 104 of the substrate 102, the protective coating 401 including a bond coat 110 between the substrate 102 and the group II germanate thermal barrier layer 106, as well as an interfacial layer 112 between the bond coat 110 and the group II germanate thermal barrier layer 106. The interfacial layer 112 is typically formed due to the high temperature of the binding/curing process of the protective coating 401. In one example, the interfacial layer 112 includes $Al_2O_3$.

In some embodiments, the protective coating deposited on the substrate includes one or more additional thermal barrier layers. For example, FIGS. 5-8 show structures 500, 600, 700, 800, which are similar to those respectively shown in FIGS. 1-4. However, the protective coating 501, 601, 701, 801 includes an additional thermal barrier layer 114 on top of the group II germanate thermal barrier coating layer 106. The additional thermal barrier layer may be any suitable material, such as yttira-stabalized zirconia or titanium oxide. The additional thermal barrier layer aids in the thermal protection the substrate 102. Similar to the group II germanate thermal barrier layer 106, the additional thermal barrier layer may be formed by a processes such as thermal spray (e.g., plasma spray), electron beam physical vapor deposition, sputtering, and enameling.

FIGS. 9-12 show structures 900, 1000, 1100, 1200, which are similar to those respectively shown in FIGS. 5-8. However, the protective coating 901, 1001, 1101, 1201 includes an interfacial layer between the group II germanate thermal barrier layer 106 and the additional thermal barrier layer 114. The interfacial layer 112 is typically formed due to the high temperature of the binding/curing process of the protective coating.

The performance requirements of thermal barrier coatings are becoming increasingly stringent. Newly developed coatings are expected to exceed the performance of the current thermal barrier coating material of choice, zirconia (e.g., yttria-stabilized zirconia). For example, some target values for improved technologies should meet the following requirements (sintered form): Thermal conductivity: less than 2.0 $W \cdot m^{-1} K^{-1}$ (@700° C.) to obtain at least 25% reduction in the thermal conductivity over yttria-stabilized zirconia. Linear thermal expansion coefficient: minimum $9 \times 10^{-6}$ $C.^{-1}$ (0-1000° C. range) to limit the thermal expansion mismatch between candidate ceramic and superalloy substrate. Maximum use temperature: higher than 1600° C. to be able to translate the achievement of the above targets into an increase in the maximum allowable use temperatures. Density: less than or equal to 7.5 ($g \cdot cm^{-3}$) to minimize the weight impact on turbine blades and disks.

The group II germanate for use in forming the group II germanate thermal barrier coating 106 can be synthesized in any suitable manner. Embodiments of exemplary synthesis methods are illustrated in the following examples. These examples are provided for illustrative purposes and are not considered limitations on the scope of inventive compositions and methods.

EXAMPLES

Example 1

Sol Gel Synthesis

A thermal barrier coating containing chromium doped magnesium germanate was manufactured in accordance with the procedure described below and tested in sintered form.

| Material | Moles | Molar Ratio to Ge |
|---|---|---|
| Chromium chloride hexahydrate | 0.001 | 0.015 |
| Germanium methoxide | 0.061 | 1.000 |
| Magnesium acetate tetrahydrate | 0.126 | 2.074 |

Mixing Procedure
1—Chromium component was dissolved in the minimum amount of methanol to dissolve it
2—Acetate component was dissolved in the minimum amount of distilled water needed to dissolve it, then twice that amount of methanol was added
3—Germanium methoxide was mixed with 200 mL methanol and placed in an ice bath with stir bar
4—Acetate component was added in slow stream to the germanium solution with continuous stirring, mixing for 30 minutes after the end of acetate addition
5—Chromium solution was added dropwise to the milky mixture, and allowed to stir for 2.5 hours in the ice bath
6—Beaker removed from ice bath, allowed to stand overnight, covered loosely. Beaker kept in hood tented loosely with a paper towel to permit methanol evaporation
7—Finished powders were calcined for 1 hour at maximum dilatometer run temperature.

Preparation of Samples for Thermal Expansion Measurement
1—grind sample so it passes through Number 70 sieve
2—mix binder at a concentration of 2.5% with ground sample
3—add 10-15% water to the dry mixture and mix by hand to granulate material
4—dry granulated material to approximately 5-7% moisture
5—Press sample in a pyrometric bar press
6—dry sample overnight in an oven set to at least 221° F. (105° C.)

Test Procedures for Data Shown in Table 1
Thermal Expansion Procedure: ASTM E228 standard test method.
Density Procedure: ASTM C830 standard test method.
Thermal Diffusivity Procedure: ASTM E1461-01 standard test method.
Thermal Conductivity Procedure: ASTM E1269 standard test method.

Maximum use temperature was defined as the temperature prior to the heat deformation of a pressed cone sample—determination of the Pyrometric Cone Equivalent (PCE) of materials using ASTM C24 (2009) Standard Test Method for Pyrometric Cone Equivalent (PCE) of Fireclay and High Alumina Refractory Materials.

The following table compares the values obtained from these tests to those values outlined above as the minimum requirements for next generation thermal barrier coatings.

TABLE 1

|  | Cr doped $Mg_2GeO_4$ | Target values |
|---|---|---|
| Thermal conductivity ($W \cdot m^{-1} K^{-1}$) (@ 700° C.) | 1.54 | Less than 2.0 |
| Linear thermal expansion coefficient (° $C.^{-1}$) (0-1000° C. range) | 1.10E-05 | Minimum 9.0E-06 |
| Maximum use temperature (° C.) | >1800* | Minimum 1600 |
| Density ($g \cdot cm^{-3}$) | 3.07 | Less than 7.5 |

As can be seen, the chromium doped magnesium germanate sample meets all of the benchmark values for a material with superior thermal protection properties. Such results are indicative that the group II germanate constructs provide superior thermal protection as a thermal barrier coating.

Example 2

Thermodynamic Oxidation Synthesis

Material
MgO powder at 42.57 weight percent
$GeO_2$ powder at 56.81 weight percent
$Cr_2O_3$ powder at 0.62 weight percent (equivalent to 0.015 Cr:Ge molar ratio)

A Spex Shatterbox swing mill with a tungsten carbide container was used to grind the MgO to a finer particle size. A Paul O. Abbe ball mill with alumina jar was used to the mix the raw materials. A Hobart 12 quart paddle mixer was used to mix the raw materials with water.

1. The MgO powder was ground in a tungsten carbide mill to minus 200 mesh.
2. The ground MgO, $GeO_2$, and $Cr_2O_3$ powders were weighed according to the composition given above and mixed for 16 hours in a ball mill without grinding media.

3. The ball milled powders were mixed in a Hobart paddle mixer with a 1 weight percent distilled water addition.

4. Approximately 5 pound batches were pressed in a steel mold at 3333 psi to produce plates (9"×4.5"×2").

5. After oven drying at 110° C., the plates were calcined at 1050° C. (66° C. below the melting temperature of $GeO_2$) for 16 days in an electric furnace.

6. Samples of a plate were analyzed for compound development by x-ray diffraction (XRD) after 8 days and 16 days.

7. The results of the XRD analysis are shown in Table II. There was a 1.8 weight percent loss after 8 hours at 1050° C. There was no additional weight loss after 16 hours at 1050° C.

8. Heat treatment of the 16 day sample for 24 hours at 1250° C. was successful in bringing the $Mg_2GeO_4$ content to 97.8%.

TABLE II

XRD Results

| Atomic Formula | Weight Percent (8 days) | Weight Percent (16 days) | Weight Percent post heat treatment |
|---|---|---|---|
| $Mg_2GeO_4$ | 75.3 | 84.7 | 97.8 |
| $MgGeO_3$ | 17.1 | 9.6 | 1.1 |
| $GeO_2$ | 0.4 | 0.1 | 0 |
| MgO | 6.1 | 4.4 | 0 |
| $MgCr_2O_4$ | 1.1 | 1.2 | 1.1 |
| Amorphous | 0.0 | 0.0 | 0 |

The synthesized group II germanate can be applied as a thermal barrier coating to a substrate in any suitable manner. Thermal barrier coatings are typically applied by processes such as thermal spray (e.g., plasma spray), electron beam physical vapor deposition, sputtering, and enameling. Such processes are exemplary and are not considered limitations on the scope of inventive compositions and methods. Depending on the particular application and circumstances, each process has its particular advantages. For example, thermal spray processing offers advantages in coating large components of complex shape. Electron beam physical vapor deposition processing provides a coating having a columnar grain microstructure consisting of small columns separated by gaps which extend into the coating, thereby allowing for substantial substrate expansion without coating cracking and/or spalling.

In an example wherein the coating is applied to the substrate via a plasma spray process, the synthesized group II germanate powder is provided in powder form and is heated by a plasma jet emanating from a plasma torch. The group II germanate powder is melted, propelled towards the substrate, and deposited on the surface thereof. It has been found that deposition of the group II germanate to a substrate by thermal spraying techniques provides for increased crystallinity. This allows for the minimization or elimination of amorphous to crystalline transformations that cause volume expansion and coating delamination. Furthermore, in embodiments in which a metallic dopant has been incorporated into the group II germanate, the dopant aids in distortion of the crystalline unit cell of the group II germanate to increase the durability of the thermal barrier coating. In another example, the coating is applied to the substrate via electron beam physical vapor deposition. The group II germanate is provided in powder form and is bombarded with an electron beam. The electron beam causes atoms from the group II germanate to transform into the gaseous phase, which then precipitate into solid form, coating the substrate.

In another example, the coating is applied via an enameling process. The group II germanate is provided in powder form and is heated to glass form. The group II germanate is then ground back into a powder, applied as a slurry in a solvent, and cured at high temperature.

Although particular embodiments of the invention have been described in detail, it is understood that the invention is not limited correspondingly in scope, but includes all changes, modifications, and equivalents coming within the spirit and terms of the claims appended hereto.

What is claimed is:

1. A coated substrate, comprising:
  a substrate, wherein the substrate comprises a superalloy; and
  a group II germanate thermal barrier coating layer provided directly in contact with a surface of the substrate, the group II germinate thermal barrier coating layer comprising $Y_2GeO_4$, wherein Y is chosen from Be, Mg, Ca, Sr, Ba, Ra, or a combination of two or more thereof, wherein the group II germanate thermal barrier coating layer has a thermal conductivity of less than 2.0 $W \cdot m^{-1} K^{-1}$ at about 700° C.

2. The coated substrate of claim 1, wherein Y comprises Mg.

3. The coated substrate of claim 1, wherein the group II germanate thermal barrier coating layer is doped with one or more metals.

4. The coated substrate of claim 3, wherein the group II germanate thermal barrier coating layer is doped with Cr, Fe, or a combination of Cr and Fe.

5. The coated substrate of claim 1, wherein the group II germanate thermal barrier coating layer comprises an olivine crystalline structure.

6. The coated substrate of claim 1, wherein the group II germanate thermal barrier coating layer has a minimum linear thermal expansion coefficient of $9.0 \times 10^{-6}$ ° $C.^{-1}$ at about 0° C. to about 1000° C.

7. The coated substrate of claim 1, wherein the group II germanate thermal barrier coating layer comprises a maximum use temperature of greater than about 1600° C.

8. The coated substrate of claim 1, wherein the group II germanate thermal barrier coating layer has a density of less than 7.5 $g/cm^3$.

9. The coated substrate of claim 1, wherein the substrate comprises a metallic substrate.

10. A method of forming the coated substrate of claim 1, the method comprising applying the group II germanate thermal barrier coating layer to the substrate by thermal spray coating, electron beam physical vapor deposition, or enameling.

11. A coated substrate, comprising:
  a substrate comprising a superalloy; and
  a group II germanate thermal barrier coating layer provided on a surface of the substrate, the group II germanate thermal barrier coating layer comprising $Y_2GeO_4$, wherein Y is chosen from Be, Mg, Ca, Sr, Ba, Ra, or a combination of two or more thereof.

12. The coated substrate of claim 11, wherein the group II germanate thermal barrier coating layer is doped with one or more metals.

13. The coated substrate of claim 11, wherein the group II germanate thermal barrier coating layer comprises an olivine crystalline structure.

14. The coated substrate of claim 11, further comprising an oxide layer between the substrate and the group II germanate thermal barrier coating layer.

15. The coated substrate of claim 11, further comprising a bond layer between the substrate and the group II germanate thermal barrier coating layer.

16. The coated substrate of claim 15, further comprising an oxide layer between the bond layer and the group II germanate thermal barrier coating layer.

17. The coated substrate of claim 11, wherein the substrate comprises a nickel superalloy.

18. The coated substrate of claim 11, further comprising a top layer formed on the group II germanate thermal barrier coating layer, the top layer comprising yttria-stabilized zirconia, titanium oxide, or a combination of yttria-stabilized zirconia and titanium oxide.

19. A coated substrate, comprising:
   a substrate;
   a group II germanate thermal barrier coating layer provided on a surface of the substrate, the group II germinate thermal barrier coating layer comprising $Y_2GeO_4$, wherein Y is chosen from Be, Mg, Ca, Sr, Ba, Ra, or a combination of two or more thereof; and
   a bond layer between the substrate and the group II germanate thermal barrier coating layer,
   wherein the bond layer comprises an aluminide bond coat.

* * * * *